July 20, 1965

W. E. RUDNICKI 3,195,675

SUPPORT MEANS FOR VEHICLE AXLE TO CONTROL MOVEMENT
THEREOF WITH RESPECT TO THE VEHICLE CHASSIS

Filed Oct. 21, 1963

WILLIAM E. RUDNICKI
INVENTOR.

BY John R. Faulkner
Jerry D. Beck
ATTORNEYS

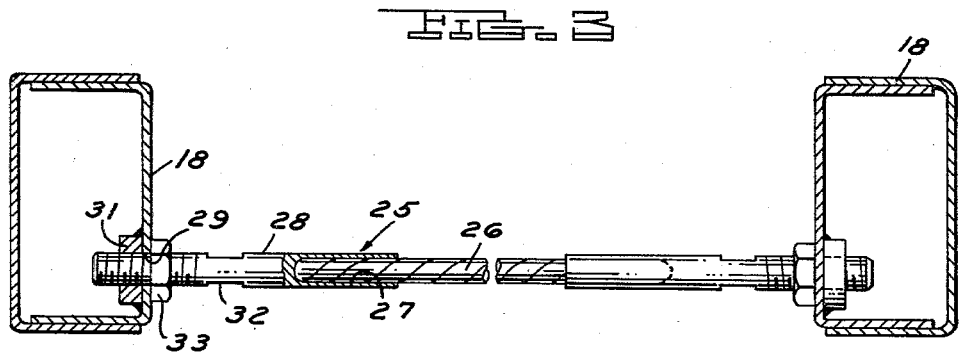
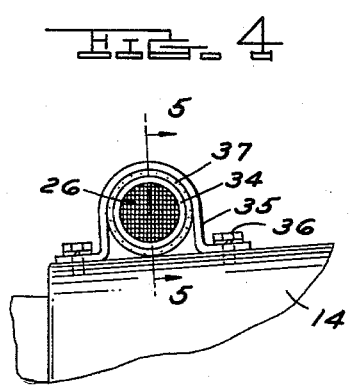
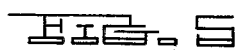
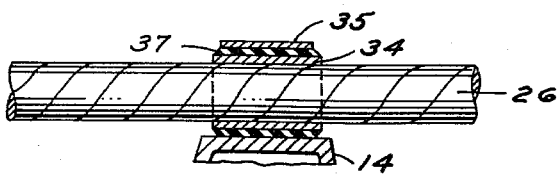

United States Patent Office 3,195,675
Patented July 20, 1965

3,195,675
SUPPORT MEANS FOR VEHICLE AXLE TO CONTROL MOVEMENT THEREOF WITH RESPECT TO THE VEHICLE CHASSIS
William E. Rudnicki, Detroit, Mich., assignor to Ford Motor Company, Dearborn, Mich., a corporation of Delaware
Filed Oct. 21, 1963, Ser. No. 317,663
4 Claims. (Cl. 180—88)

This invention relates to a position control means for a vehicle axle and more particularly to a means for restricting the movement of a rear axle of a motor vehicle.

In conventional motor vehicles, the vehicle body and frame are usually resiliently supported on the rear axle housing. This rear axle housing extends transversely of the vehicle and has a differential case at its center. The differential case is usually formed with a longitudinally extending nose portion to house the pinion shaft for the differential gearing. The pinion shaft is connected to the drive shaft of the vehicle by a universal joint that is positioned just forward of the nose portion. Sudden braking or acceleration of the vehicle tends to rotate the axle housing about its center axis causing the nose portion to swing either upwardly or downwardly. Such axle movement is often referred to as axle windup. Axle windup resulting from acceleration when combined with jounce movement of the axle housing may result in the nose portion to strike the vehicle frame or body causing early fatigue or failure of the universal joint. Frequently, resilient bumpers are provided to prevent metal-to-metal impact between the differential case and the vehicle body.

Also, when one road wheel is in jounce or the vehicle body is tilted during cornering, lateral displacement of the wheel and axle assembly relative to the frame and body structure results. This lateral displacement may cause lateral shake of the vehicle body to bring about objectional discomfort to the occupants thereof.

The present invention overcomes some of these disadvantages by incorporating a transversely extending cable means that has its end portion connected to the frame at transversely spaced points and its center portion connected to the nose portion of the differential case.

Accordingly, it is one of the principal objects of this invention to provide a means for controlling the movement of a vehicle axle.

It is a further object of this invention to limit the vertical deflection of the rear axle housing to permit a reduction in the height of the driveline tunnel.

It is still a further object of this invention to provide a means which will substantially reduce body shake and vibration to improve passenger riding comfort and general stability in the operation of a motor vehicle.

These and other objects of this invention will become more apparent from the following detailed description taken in conjunction with the accompanying drawings in which:

FIGURE 3 is a front elevational view depicting the attachment of the end portion of the cable of this invention to the vehicle frame at transversely spaced points and with the center portion of the cable means being omitted for clarity;

FIGURE 4 is a sectional view taken through the center portion of the cable along line 4—4 of FIGURE 1; and, FIGURE 5 is a sectional view taken along line 5—5 of FIGURE 4.

Figure 1:
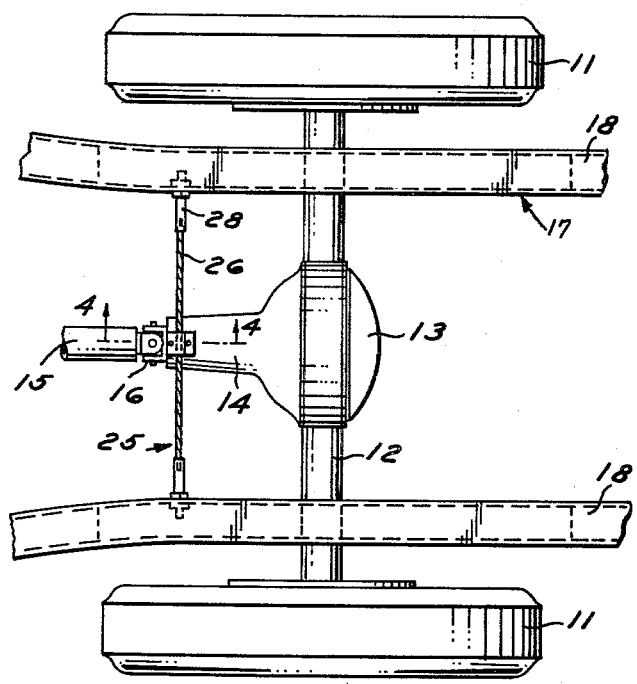
FIGURE 1 is a fragmentary top plan view of a portion of the rear chassis of a motor vehicle incorporating a cable of this invention which interconnects the differential case nose portion with the vehicle frame.
Figure 2:
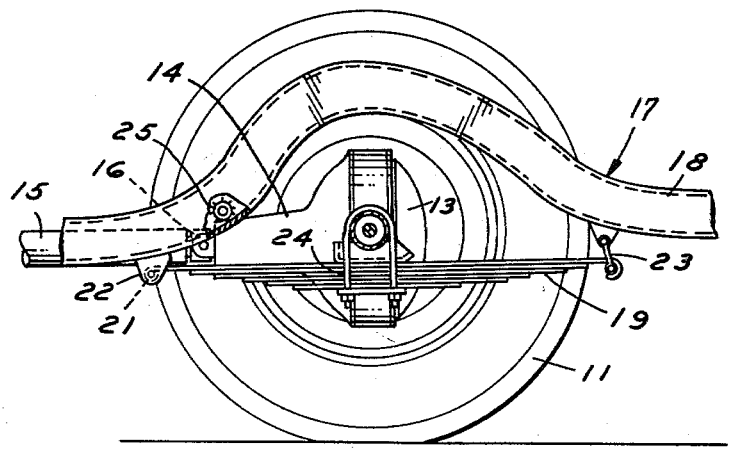
FIGURE 2 is a side elevational view of a portion of the rear chassis as seen in FIGURE 1.

Referring now to the drawings, FIGURES 1 and 2 disclose rear road wheels 11 disposed on opposite ends of a tubular rear axle housing 12. At the center of the rear axle housing 12 is a differential case 13 having a forwardly projecting nose portion 14 which accommodates conventional differential gearing. The gearing is connected to the drive shaft 15 of the vehicle by a universal joint 16 located forward of the nose portion 14.

The sprung portion of the vehicle includes a frame 17 constructed from interconnected longitudinal box-shaped side rails 18 with each side rail disposed on opposite sides of the vehicle. The frame 17 is resiliently supported on the rear axle housing 12 by a pair of leaf springs 19.

The forward end of each leaf spring 19 has an eye portion 21 that is pivotally connected to a bracket 22 attached to each side rail 18. The rear end of each leaf spring 19 is pivotally attached to its respective side rail 18 by a shackle 23. U-bolts 24 secure the center of each leaf spring 19 to the end portions of the rear axle housing 12.

To control the position of the rear axle housing 12 and its associated unsprung components of the vehicle, an axle positioning means, designated as 25, is provided.

In the preferred embodiment of this invention, the positioning means 25 comprises a cable 26 that extends transversely of the vehicle at a point just above the forwardly extending end of the nose portion 14. Each end of the cable 26 is swaged into a bore 27 at one end of a rod 28. The other end of the rod 28 is threaded and extends through an opening 29 in the inwardly facing wall of each box-shaped side rail 18. A weld nut 31 is secured to this inwardly facing wall to threadingly receive the threaded end of the rod 28. A flat 32 is cut into the perimeter of the rod 28 intermediate its ends to allow threading the rod 28 into the weld nut 31 by use of a conventional tool to place the cable 26 under tension. A lock nut 33 on each threaded end of the rods 28 locks the cable 26 in position.

As best seen in FIGURES 4 and 5, the center portion of the cable 26 is securely encompassed by a hardened steel ring 34. To secure the cable 26 to the nose portion 14 of the differential case 13, a clamping band 35 is placed over the ring with the ends of the band attached to the nose portion by a pair of bolts 36. A resilient bushing 37 may also be disposed between the hardened steel ring 34 and the clamping band 35 to create a resilient barrier between the sprung portions and unsprung portions of the vehicle.

From this description, it can be noted that the nose portion 14 is securely attached to the center of the cable 26. The rods 28 attached to each end portion of the cable 26 are secured to the side rails at transversely spaced points. A cable constructed from a braided steel wire with a diameter of ¼ inch and placed under a tensile stress of 1200 pounds has been found satisfactory to provide the support and operational characteristics desired when applied to a vehicle equipped with a Hotchkiss drive. Only after the cable is placed under tension is the center of the cable clamped to the nose portion 14 by means of the clamping band 35.

The taut cable attached to the nose portion 14 prevents the rotational movement of the rear axle housing about its center axis during the application of the wheel brakes or the application of power through the drive shaft. Thus, axle windup control is provided which contributes to car leveling. Vertical deflection of the nose portion during normal jounce and rebound is also minimized, thereby preventing the universal connection, the drive shaft and the nose portion from hitting the underside of the vehicle body. This will permit a substantial height reduction of the driveline tunnel which heretofore had to be of a sufficient size to accommodate the movement of the nose portion. Thus, greater leg room is provided, especially for those passengers occupying the middle of the rear seat. The transmission of vibration and noises from the rear axle housing is minimized by the cable which also acts as a dampening device and by the resilient bushing that can be readily interposed between the hardened steel ring and the clamping band.

Further, the prevention of the swinging movement of the axle eliminates undesirable flexing of the leaf springs. A lateral stabilizing function between the axle housing and the vehicle frame is achieved as the nose portion of the axle assembly is secured to the frame at laterally spaced points by the cable. This will considerably reduce tilting of the automobile frame and body relative to the axle and the road wheels and minimizes the lateral displacement of the axle relative to the body to overcome body shake.

The leaf springs connecting the rear axle housing to the side rails of the frame as described in this specification are conventional, but it is to be understood that the axle positioning means of this invention may also be readily adapted to any other type of vehicle suspension system.

It is to be understood that this invention is not limited to the exact construction shown and described but that various changes and modifications may be made without departing from the spirit and scope of the invention as defined by the appended claims.

I claim:

1. A motor vehicle having a frame, road wheels disposed on opposite sides of said frame, a transversely extending axle means interconnecting said road wheels, spring means resiliently supporting said axle means on said frame for rising and falling movement with respect thereto, and cable means extending transversely of said frame, said cable means having its end portions connected to said frame and its center portion directly attached to said axle means at a point longitudinally spaced from the center axis of said axle means.

2. A motor vehicle having a frame, road wheels disposed on opposite sides of said frame, an axle with a differential carrier housing at its center interconnecting said road wheels, spring means resiliently connecting said axle to said frame, cable means extending transversely of said vehicle at a point longitudinally spaced from said axle, the ends of said cable means being connected to said frame at transversely spaced points, the center of said cable means being directly secured to said differential carrier housing at a point spaced from the center axis of said axle to restrain rotational movement of said axle about its center axis and restrict vertical movement of said differential carrier housing.

3. A motor vehicle having a frame, a vehicle body attached to said frame, road wheels disposed on opposite sides of said frame, an axle means extending transversely of the vehicle with each end of said axle means rotatably supporting one road wheel, said axle means having a differential carrier intermediate its ends, said differential carrier having a nose portion extending longitudinally forwardly therefrom, means resiliently supporting said axle means from said frame to allow for rising and falling movement of said road wheels with respect to said frame, a cable extending transversely of said frame and longitudinally spaced from said axle means, the end portions of said cable being connected at transversely spaced points to said frame, adjusting means for said cable to place the latter under tension, the center of said cable being resiliently connected to said nose portion to restrain movement of said axle means with respect to said vehicle body.

4. A motor vehicle having a frame, a vehicle body attached to said frame, road wheels disposed on opposite sides of said frame, a rear axle extending transversely of the vehicle with each end of said rear axle rotatably supporting one road wheel, said rear axle having a differential carrier intermediate its ends, said differential carrier having a nose portion extending longitudinally forwardly therefrom, spring means resiliently supporting said rear axle from said frame to allow for rising and falling movement of said road wheels with respect to said frame, a cable extending transversely of said frame and longitudinally spaced from said rear axle, the end portions of said cable being connected at transversely spaced points to said frame, adjusting means on at least one end portion of said cable to place said cable under tension, the center portion of said cable being securely clamped to said nose portion to restrain lateral and rotational movement of said rear axle and restrict vertical movement of said differential carrier.

References Cited by the Examiner
UNITED STATES PATENTS

| | | |
|---|---|---|
| 731,473 | 6/03 | Pontois. |
| 1,897,542 | 2/33 | West _____ 180—70 X |
| 2,434,055 | 1/48 | Sauer. |
| 2,485,434 | 10/49 | Cynamon et al. _____ 180—88 |

A. HARRY LEVY, *Primary Examiner*.